Aug. 10, 1926.
G. C. CUSACK
1,595,385
FROZEN FOOD PACKAGE
Filed August 8, 1925
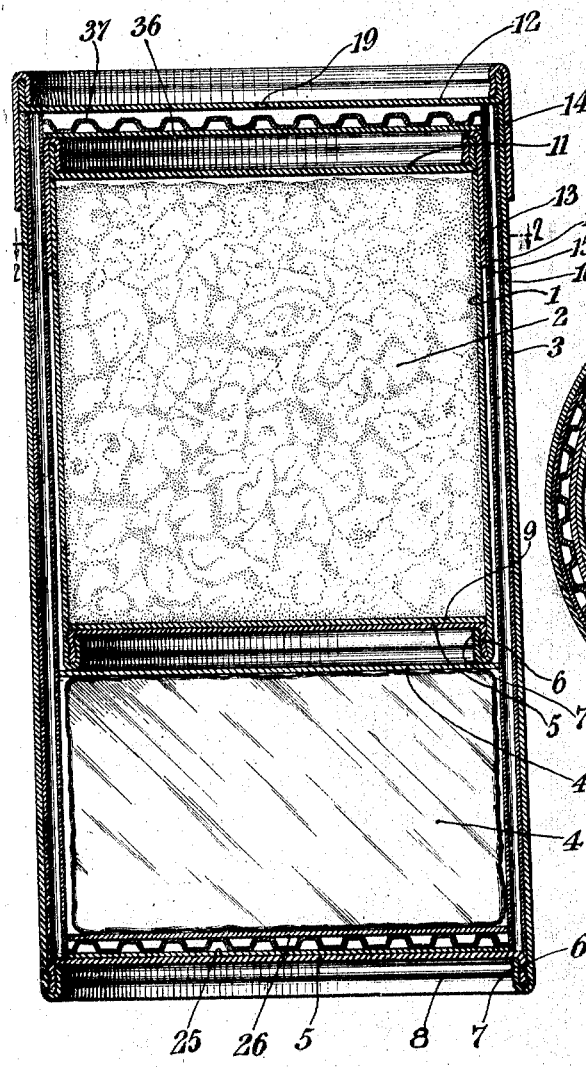
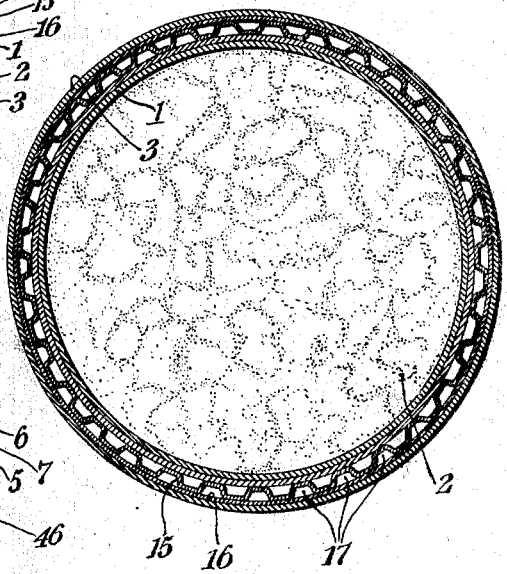
Inventor
George C. Cusack
By his Attorney Patented Aug. 10, 1926.

1,595,385

UNITED STATES PATENT OFFICE.

GEORGE C. CUSACK, OF WEST NEW YORK, NEW JERSEY, ASSIGNOR TO DRYICE CORPORATION OF AMERICA, A CORPORATION OF DELAWARE.

FROZEN-FOOD PACKAGE.

Application filed August 8, 1925. Serial No. 48,964.

My present invention involves a special application of some of the general principles set forth in patent to Slate, No. 1,511,306, granted October 14, 1924, with reference to the use of frozen carbon dioxide, particularly in the form of ice made either by direct freezing of the liquid carbon dioxide or by highly compressing carbon dioxide snow.

As explained in said patent, the carbon dioxide ice is much heavier than water and has a very low melting point, something like 112°–114° below zero Fahrenheit. When melted at pressures near atmospheric, it sublimates directly to a gas without any intermediate liquid state. Hence, there is no liquid to wet things but, on the contrary, the gas being anhydrous, tends to dry up moisture. Moreover, the gas is far heavier than air so that it will displace air and, if the container is not too leaky, will completely exclude it. Such heavy, dry gas is a very efficient heat insulator, and for purposes of my present invention, such gas may be relied upon to furnish most of the insulation. Under proper conditions, this insulating effect plus the refrigerating effect due to latent heat absorbed in sublimating and sensible heat absorption by the resulting gas in warming up from such a low temperature, combine to make a given volume of carbon dioxide ice, six to ten times as effective as the same volume of water ice.

All of the above qualities, particularly adapt the carbon dioxide ice for the specific purpose of my present invention, which particularly concerns distributing methods and means for the retail ice cream trade, particularly small quantity "over-the-counter" trade. At present, this trade is greatly limited because when the ice cream is packed in the ordinary paper containers, it must go almost directly from the seller to the table of the user if it is to be eaten while in anything like the desired frozen condition.

I am aware that attempts have been made to lessen this difficulty by packing the ice cream in containers of waterproof paper, in lieu of the metal cans commonly employed for such purposes, as in patent to Klotz 697,496. But this involves doing with paper exactly what has been before done with the metal cans, namely, placing the container in a water-tight pail of very much larger size and filling the interspace with the usual cracked ice and salt whereby the pail speedily fills with salt-water up to the level of the overflow pipe, through which the water spills wherever the pail happens to be. I am also aware that frozen carbon dioxide has been proposed as the refrigerant in one of the many arrangements contemplated by the above specified Slate patent, but in this arrangement there is an inner insulating container for frozen carbon dioxide, around which container, the ice cream, food or other perishable products are packed so heat can reach the frozen carbon dioxide only by passing through the products to be refrigerated and then through the walls of the inner container.

My present improvement, while utilizing inner and outer containers with solid carbon dioxide as a refrigerant, embodies a principle that is specifically new as applied to intensely cold gas producing refrigerants. It involves extravagance in the use of frozen carbon dioxide to produce sufficient of the carbon dioxide gas for combined insulating and refrigerating purposes, and particularly to afford a gas substitute for the solid insulation. This novel idea I apply to the practical commercial purpose of successfully utilizing containers of light, cheap material, so thin as to be of relatively small insulating value, but adapted to effectively utilize the carbon dioxide gas as insulation.

By my invention, I refrigerate and also insulate the frozen ice cream by surrounding the ice cream container with dry cold carbon dioxide gas, continuously supplied by evaporation from the carbon dioxide ice, which latter is enclosed in the same wrapper with the ice cream container, but in exposed relation to the exterior, so that it is directly accessible to heat from the exterior, and is preferably more exposed to said exterior heat than is the ice cream. I find that the carbon dioxide ice does not have to be very effectively insulated from the exterior, nor from the ice cream container, and that the wrapper need not afford much insulation nor need it be very tight in order to hold the continuously supplied gas, fill the wrapper, exclude air and afford dry insulation from the heat, sufficiently to serve the transitory commercial purposes of over-the-counter trade in ice cream. The great latent heat absorption by sublimation of the carbon dioxide from solid to gas form, plus the sensible heat absorption by the cold gas, will take care of the heat that penetrates from the outside even though the wrapper be quite thin. The ice cream being but slightly insulated from the carbon dioxide by the inner container, tends to over-freeze the ice cream and may do so to such an extent that it will be entirely too hard for eating purposes, but I find that by using standard construction and sizes of containers, a cycle of overfreezing and warming back to standard may be predetermined for a desired period by proper selection of the amount of the carbon dioxide ice to be enclosed with the ice cream. For instance, a package of given size and construction may be supplied with a predetermined weight of ice calculated to last say, two hours or four hours or eight hours, as may be desired. During this period, portions or all of the ice cream may be much over-frozen, but when the carbon dioxide approaches exhaustion, the insulation will retard warming up, thereby promoting uniform softening of the mass to consistency suitable for eating. Otherwise, the outside layer of ice cream might become melted while the core remained over-frozen. In practice, no very careful designing is necessary to avoid this trouble.

From the above, it will be evident that my invention makes it possible to refrigerate for a predetermined period according to a temperature curve beginning at or preferably below the desired temperature of the frozen ice cream, decreasing to a minimum and then rising again to near a normal ice cream temperature, near the end of the predetermined period.

In the particular form shown herein, the paper container for the ice cream has relatively non-absorbent surfaces and is gas tight, as against ordinary pressures, while the exterior wrapper is a larger container of similar construction, except for a vent which permits relief of internal pressure by outflow of air and excess gas from the interior. Preferably, the vent is in the top of the outer container or wrapper so that the air will be displaced and forced out before the excess gas begins to escape. Preferably, also, the inner ice cream container is supported in such a way that a substantial layer of the cold dry insulating gas from the ice, may envelope and flow freely around and in bathing contact with it.

In most cases, however, economy of carbon dioxide ice is not important and more rapid evaporation, producing increased volumes of refrigerant gas, may be had by putting the vent in the bottom instead of the top, or turning the container upside down so that the ice will be in the upper or warmest part thereof, or by both locating the vent in the bottom and the ice in the top. Even a leaky paper bag may be a sufficient wrapper for keeping the exterior of the ice cream container surrounded and protected by the cold carbon dioxide gas, for an hour or so in the open air, or for a longer time in an ordinary household refrigerator; and any of the usual paper containers may be used for the ice cream.

The above and other features of my invention will be more readily understood from the following description in connection with the accompanying drawings, in which Fig. 1 is a vertical axial section showing one form of a refrigerated ice cream package embodying my invention; and Fig. 2 is a horizontal section on the line 2—2, Fig. 1.

In these drawings the inner container 1 for the ice cream 2 and the outer container 3 in which the ice cream container is enclosed with the carbon dioxide ice 4, are of similar construction, substantially the same as certain well known types of paper containers now used for lemonade, orangeade, ice cream, etc. These containers have paper bottoms 5 flanged as at 6 and secured to the cylindrical body of the container by an inturned annular portion 7 of the latter, compressed and interengaged to form a water-tight joint by pressure devices operating to form a locking bend at 8. The bottom 5 and flange 6 are usually of more pliable pasteboard facilitating the formation of such a joint and a false bottom 9 of stiffer pasteboard having a moisture proof surface is fitted in over the bottom 5.

The inner and outer containers have covers 11 and 12 respectively, of substantially the same construction as the bottoms just described, the cylindrical flanges 13 and 14 respectively fitting the respective body portions 1 and 3 closely, so as to form an easily slidable but practically water-tight and gas-tight joint therewith.

Outer container 3 is enough larger than ice cream container 1 so that ample room is left to enclose along with the ice cream container, the frozen carbon dioxide 4. While this may be in fragmentary form or even in loose snow form, it is highly desirable to have it a single cake of dense ice, because in the latter form it will be much slower melting.

Preferably, the space for the ice is provided by making the container 1 shorter than the container 3 because in this way the ice space may be made to have relatively large volume as compared with the area of the enclosing surfaces through which heat can be transmitted for melting the ice. It will be evident, however, that the ice cream container might be midway, so as to leave spaces at each end, each containing a cake of the carbon dioxide ice, or the outer container might be longer so that the cake of ice 4 will intervene between two ice cream containers.

In the preferred construction, the inner container is enough smaller than the outer one to permit fitting in the interspace a cylindrical sheet of corrugated paper-board comprising the corrugated portion 15 secured to the backing 16 in the well known manner. Preferably, the corrugations are vertical, thereby affording a multiplicity of flues 17, which are filled with an insulating layer of the cold dry gas after the air has been displaced and driven out of the container. Thereafter, there will be a steady flow of the gas outward through these flues as long as the carbon dioxide ice holds out and continues melting.

If the outer container is leaky, escape of the air and excess gas will take care of itself, but in the approximately air-tight containers shown herein it is necessary to have a vent 19 to relieve the internal pressure which would otherwise blow the cover off the container. This vent may be a mere pinhole. As stated above, such a vent is preferably located in the top of the container, because this insures maximum gas insulation with minimum evaporation rate for the solid carbon dioxide, but it is to be noted that such arrangement is only a preference, and where the quantity of the ice, or its rate of evaporation is insufficient to maintain a sufficiently low temperature in a given construction of container, a higher evaporation rate and greater evolution of refrigerant gas will result where the vent is in the bottom, or the carbon dioxide in the top, or both.

Preferably, the ice is prevented from contact with the bottom 5 of the outer container by a circular disc of corrugated paperboard 25, 26, loosely fitted within the cylindrical corrugated lining 15.

A similar corrugated disc 36, 37, is particularly desirable at the top since it closes in a narrow gas space above the top of the ice cream container protecting the ice cream from the heat of any air that may enter through 19 while affording free outlet channels for flow of escaping gas to the vent 19.

In some cases, as for instance where butter is sold in the container, it may be desirable also to have a pasteboard disc as 46, with or without corrugation, to close in the cavity below the bottom 5 of the inner container and to prevent direct contact of the ice with said bottom.

It will be observed that in the complete device in its preferred form, the carbon dioxide ice is insulated from the ice cream by the ice cream container and by the surrounding envelope of cold dry gas and that it is insulated from the exterior by the walls of the outer container, by the inner corrugated paper lining and by the gas which is evolved upon melting. It will be evident that the paper material, particularly the corrugated pasteboard, is flexible in yielding and likely to take more or less irregular forms, and these cannot well be indicated in the drawings. It will be evident, however, that whereas the vertical corrugations 15 are shown as fitted only against the flange 13 of the inner cover, in practice the fit may be such a loose one that the cover flange is freely slidable within the corrugated paper envelope, or the fit may be a tight one so that the corrugations will grip both the container body 1 and its cover flange 11.

It will be obvious that for many purposes, the outer container or wrapper might consist merely of the corrugated pasteboard members held together in any suitable way as by tying them up in ordinary wrapping paper.

It will be recognized that while the insulation afforded by the inner container is of some importance, it is useful for the entirely different practical purpose of keeping the carbon dioxide ice from imparting an undesirable flavor to the ice cream, such as is likely to result from traces of oil and other impurities that are apt to be found in the carbon dioxide ice products that are now commercially available. There is, of course, the other purpose of a safety device, preventing outflow of the ice cream in case through accident or oversight it becomes melted, but if and when perfectly pure carbon dioxide ice becomes available, it will be possible to enclose it directly in the same container that holds the ice cream, all of the insulation being incorporated in the walls of this one container.

The name "ice cream", as used herein is used in a broad sense and is intended to include frozen puddings and the ordinary frozen lemonades, orangeades, etc., more commonly known as water ices. Moreover, the container 1 as disclosed herein is primarily designed for drinks such as lemonade, orange juice, grape juice, etc. and a very important use for this particular embodiment of my invention is the cooling or partial freezing or complete freezing of such drinks either for transportation purposes or merely to refrigerate them to cold unfrozen drink or partially or wholly frozen forms adapted for drinking or for eating with a spoon.

By making the inner container of metal, cocktail or liquor frappé is facilitated and shaking may be utilized to hasten the process since the gas producing refrigerant is not mixed with liquor and the liquor container does not have to be constructed for withstanding or venting gas pressures, as is the case where carbon dioxide ice or snow has been directly applied to the liquid. Making the liquid container of metal is a convenience rather than a necessity even for these special purposes.

I claim:

1. A dry vending package for ice cream, including frozen ice cream and a quantity of frozen carbon dioxide to absorb heat and to afford dry, cold gas for insulating the same, said ice cream being enclosed in a paper container that is practically moisture proof and has a practically gas tight cover; an enclosing container and cover that is similar but has a vent and is of slightly greater diameter and substantially greater length, said enclosing container having said ice cream container occupying one portion of its length and the frozen carbon dioxide another portion of its length.

2. A dry vending package for ice cream, including frozen ice cream and a quantity of frozen carbon dioxide to absorb heat and to afford dry, cold gas for insulating the same, said ice cream being enclosed in a paper container that is practically moisture proof and has a practically gas tight cover; an enclosing container and cover that is similar but has a vent in one end and is of slightly greater diameter and substantially greater length, said enclosing container having said ice cream container in its vented end and the frozen carbon dioxide in its unvented end, and paper insulation in the interspace between the two containers spacing them apart and affording flues for escape of gas from the carbon dioxide ice to the exterior atmosphere.

3. A dry vending package for ice cream, including frozen ice cream and a quantity of frozen carbon dioxide to absorb heat and to afford dry, cold gas for insulating the same, said ice cream being enclosed in a paper container that is practically moisture proof and has a practically gas tight cover; an enclosing container and cover that is similar but has a vent in one end and is of slightly greater diameter and substantially greater length, said enclosing container having said ice cream container in its upper portion and the frozen carbon dioxide in its lower portion, with a paper insulating member between them and corrugated paper insulation in the interspace between the two containers spacing them apart and affording flues for escape of gas from the carbon dioxide ice to the exterior atmosphere.

4. A dry vending package, comprising a paper container containing frozen ice cream, and an outer paper wrapper containing frozen carbon dioxide for the formation of carbon dioxide gas, said wrapper having a vent for permitting escape of any air present and of said carbon dioxide gas.

5. A dry vending package, comprising a substantially gas tight paper container containing frozen ice cream, and an outer paper wrapper containing frozen carbon dioxide for the formation of carbon dioxide gas, said wrapper having a vent for permitting escape of any air present and of said carbon dioxide gas.

6. A dry vending package, comprising a practically water tight paper container containing frozen ice cream, and an outer paper wrapper containing frozen carbon dioxide for the formation of carbon dioxide gas, said wrapper having a vent for permitting escape of any air present and of said carbon dioxide gas.

7. A package including a cold product and a quantity of frozen carbon dioxide to refrigerate and to afford dry cold gas for insulating the same, said product being enclosed in and separated from said gas by a water tight paper container, a similar container of slightly greater diameter but substantially greater length, enclosing said product container in the upper portion thereof and said frozen carbon dioxide in the lower portion thereof.

8. A package including a cold product and a quantity of frozen carbon dioxide to refrigerate and to afford dry cold gas for insulating the same, said product being enclosed in and separated from said gas by a water tight paper container, a similar container of slightly greater diameter but substantially greater length, enclosing said product container in the upper portion thereof and said frozen carbon dioxide in the lower portion thereof and corrugated insulation in the interspace between the two containers, spacing them apart and affording flues for upward escape of gas through a vent above the level of said product container.

9. A package including a cold product and a quantity of frozen carbon dioxide to refrigerate and to afford dry cold gas for insulating the same, said product being enclosed in and separated from said gas by a water tight paper container, a similar container with a removable vented cover, adapted to enclose said product container and said carbon dioxide ice.

10. A package comprising a quantity of ice cream or the like in a practically water tight paper container and another paper container of larger size enclosing said ice cream container with a desired amount of anhydrous refrigerant adapted, upon absorption of latent heat, to evolve insulating refrigerant gas to prevent melting of said ice cream, said outer container affording outlet for air and excess gas mainly above said ice cream.

11. A package comprising a quantity of ice cream or the like in a practically water tight paper container and another paper container of larger size enclosing said ice cream container with a desired amount of anhydrous refrigerant adapted, upon absorption of latent heat, to evolve insulating refrigerant gas to prevent melting of said ice cream, and insulating packing affording air spaces for circulation of the gas about the ice cream container.

12. A package comprising a quantity of ice cream or the like in a practically water tight paper container and another paper container of larger size enclosing said ice cream container with a desired amount of anhydrous refrigerant adapted, upon absorption of latent heat, to evolve insulating refrigerant gas to prevent melting of said ice cream, said outer container affording outlet for air and excess gas mainly above said ice cream and insulating packing affording air spaces for circulation of the gas about the ice cream container.

13. A package comprising a cold or frozen product in a practically water tight, non-metallic container, in operative relation to a desired quantity of carbon dioxide ice, the whole encased by another similar container of larger diameter and substantially greater length and a corrugated non-metallic lining between said containers affording air spaces for circulation of the gas about the container of said cold product.

14. A dry vending package for cold food or drink products, including a quantity of said product and a cake of carbon dioxide ice to refrigerate and to afford dry cold gas for insulating the same, said product being enclosed in a non-metallic container that is practically gas tight and which is in turn enclosed with said ice cake in a similar container having a non-metallic water tight slip cover and a vent to atmosphere.

15. A dry vending package for cold food or drink products, including a quantity of said product and a cake of carbon dioxide ice to refrigerate and to afford dry cold gas for insulating the same, said product being enclosed in a non-metallic container that is practically gas tight and which is in turn enclosed with said ice cake in a similar container having a non-metallic water tight slip cover and a vent to atmosphere; and a lining in the interspace between the two containers spacing them apart and affording passages for flow of the gas on all sides of said product container.

16. A frozen product and means for effectively insulating and refrigerating the same, including a vented container therefor having walls that afford insufficient insulation against conduction of heat from the exterior and in said container with the frozen product, a body of frozen carbon dioxide arranged so as to be exposed to said exterior heat at least as much as is said product.

17. A dry package of frozen product, including a quantity of said product in frozen condition and a quantity of frozen carbon dioxide to absorb heat and afford dry, cold gas for insulating the same, both enclosed in a gas retaining container having relatively thin walls of insulating material and having a leakage outlet for escape of air and of carbon dioxide gas; the frozen carbon dioxide occupying a portion of the length of the container and the frozen product occupying another portion of the length of the container and said product being in freezing proximity to said frozen carbon dioxide but separated therefrom by practically moisture-proof inner walls, said inner walls being within but spaced apart from the exterior walls so as to afford insulating interspaces between the outer and inner walls accessible for and filled by the dry, cold gas evaporating from the frozen carbon dioxide.

Signed at New York in the county of New York, and State of New York, this 7th day of August, A. D. 1925.

GEORGE C. CUSACK.